Figure 1:
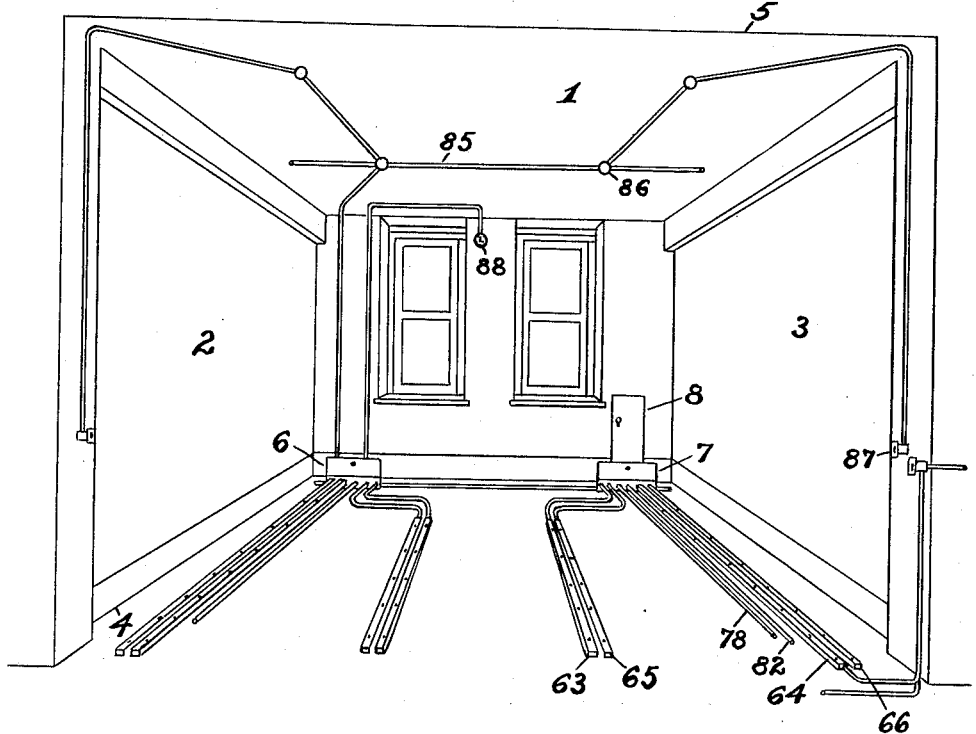

May 15, 1934.  F. J. RESKE ET AL  1,958,927
COMBINATION FLOOR AND WALL JUNCTION BOX
Filed June 26, 1930  3 Sheets-Sheet 1

Inventors
Frank J. Reske
Edwin J. Truthan
By G. E. Dunstan,
their Attorney

May 15, 1934.  F. J. RESKE ET AL  1,958,927
COMBINATION FLOOR AND WALL JUNCTION BOX
Filed June 26, 1930  3 Sheets-Sheet 2
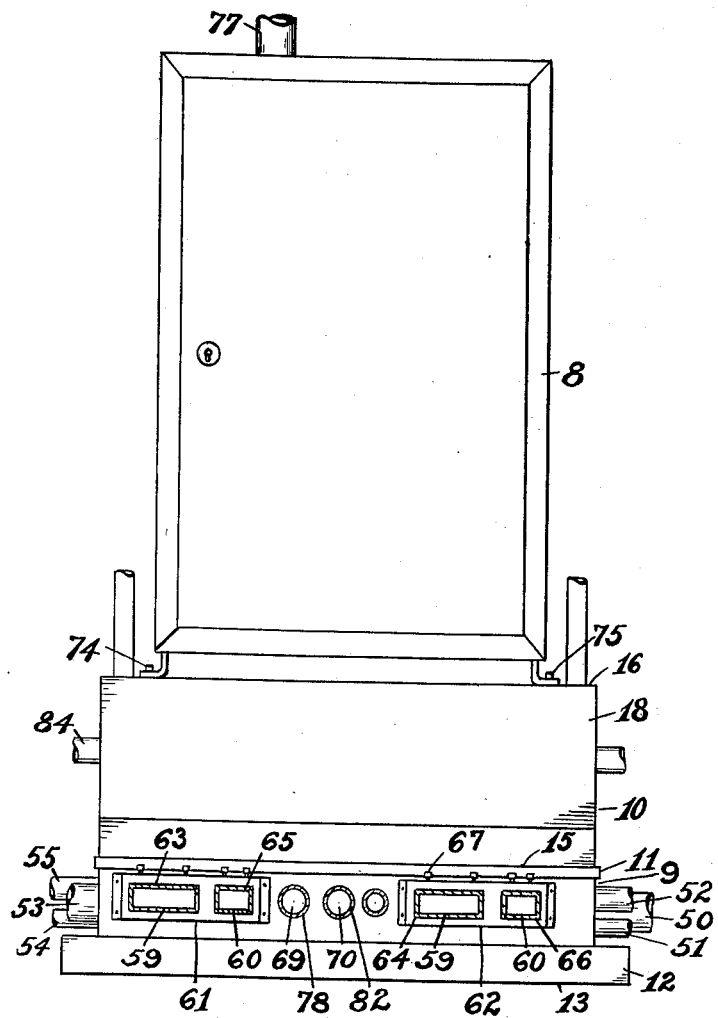
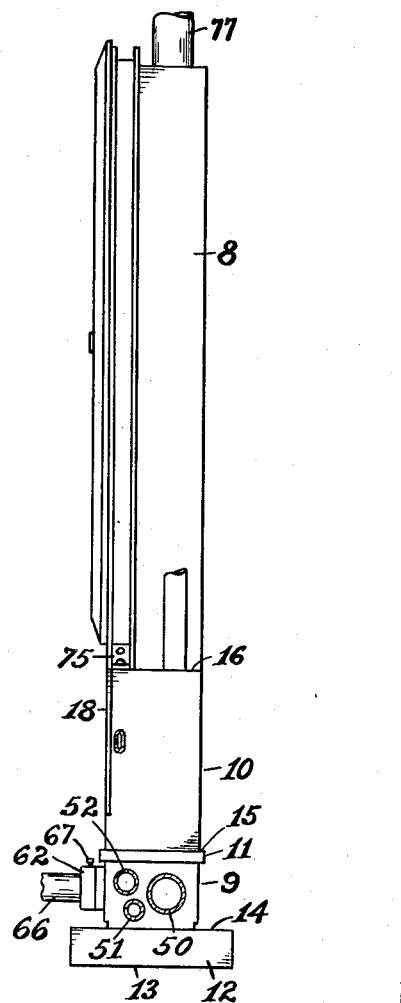
Inventors
Frank J. Reske
Edwin J. Truthan
By G. E. Dunstan,
their Attorney

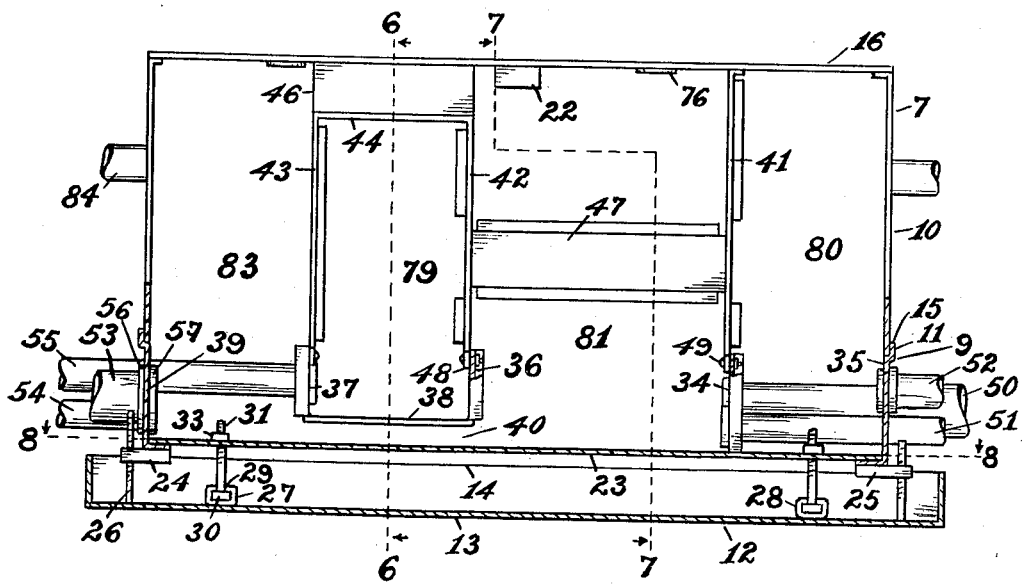
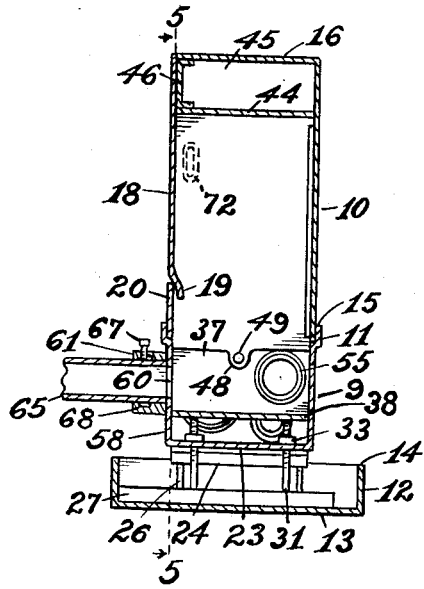
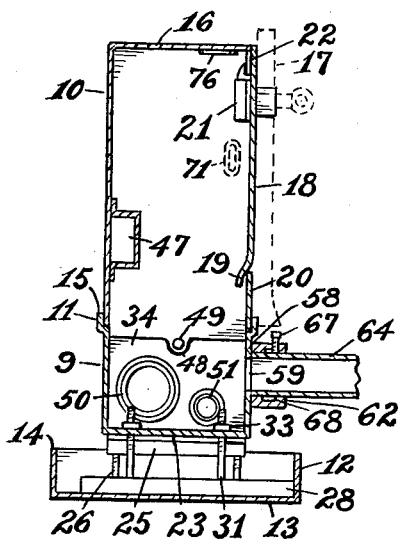

Patented May 15, 1934

1,958,927

UNITED STATES PATENT OFFICE 1,958,927

COMBINATION FLOOR AND WALL JUNCTION BOX

Frank J. Reske and Edwin J. Truthan, Cleveland, Ohio

Application June 26, 1930, Serial No. 463,894

11 Claims. (Cl. 247—19)

This invention relates to junction boxes for conduits for electric wires and more particularly to combination floor and wall junction boxes for said purpose.

The main object of the invention is to provide a combination floor and wall junction box, which is practicable for both floor and also wall and ceiling distribution of electric wires for various services such as power, lighting, telephones, buzzers and clocks.

Another object of the invention is to provide a combination floor and wall junction box of said character, which permits the distribution of electric wires for various services in each individual bay or adjoining bay or bays of an office building to enable the individual servicing or metering of electric current.

Another object of the invention is to provide a combination floor and wall junction box of said character, which junction box is adapted to be installed in the concrete floor and extend up the wall of an office building during construction thereof for connection to said box of conduits for various electric wires, and which will permit ready connection thereto of additional conduits for convenient changes to the wiring system should the requirements of a tenant demand same.

Another object of the invention is to provide a combination floor and wall junction box of the above character, in which the lower or floor portion of the box may be first set and built into the floor and the upper or wall portion of the box later fixed to said lower portion of the box.

Other objects of the invention are to provide a combination floor and wall junction box of said character, which is of simple and practical construction, is conveniently and quickly set in position, and to which there is ready access, and to which the electric conduits are easily connected thereto or disconnected therefrom when it is desired to make changes or additions in the electric wiring or to test the same.

With the above and other objects in view, the invention will be hereinafter fully described as illustrated in the accompanying drawings, and the novel features thereof will be distinctly pointed out in the appended claims.

In the drawings, similar characters of reference indicate corresponding parts.

Figure 8:
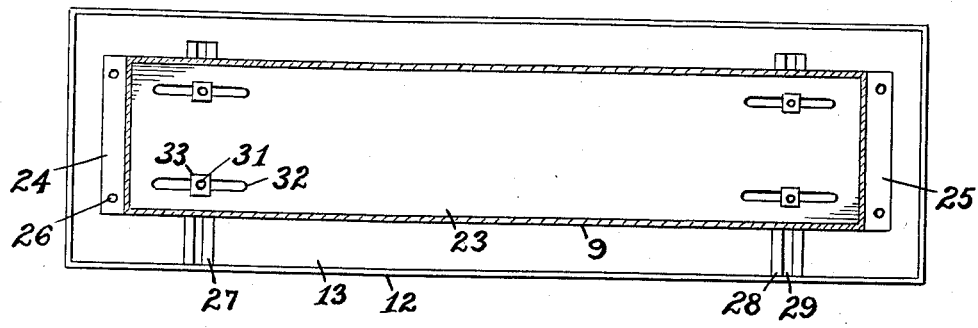

Figure 1 is a perspective view illustrating a bay of an office building, in which is installed a junction box constructed in accordance with our invention and from which extends an electric wiring system for various purposes, Fig. 2 is a front elevation of a junction box constructed in accordance with our invention, and a telephone distribution strip cabinet fixed thereto, Fig. 3 is a side view of same, Fig. 4 is a plan view of same, Fig. 5 is a sectional elevation of the junction box taken on line 5—5 of Fig. 6, Fig. 6 is a cross sectional view taken on line 6—6 of Fig. 5, Fig. 7 is a cross sectional view taken on line 7—7 of Fig. 5, and Fig. 8 is a sectional plan view taken on line 8—8 of Fig. 5.

Referring to the drawings, 1 represents the outer end wall, 2 and 3 the side walls, 4 the floor line and 5 the ceiling line of the bay of an office or other building. Conduits for various electric wires and extending from combination floor and wall junction boxes constructed in accordance with our invention are arranged in the floor, walls and ceiling as shown, or in any other suitable arrangement. The junction boxes, indicated as a whole by 6 and 7, are of the same general construction except that they are right and left hand boxes for convenience in such arrangement of electric wire distribution as shown, and, to the box 7 is added a telephone distribution strip cabinet 8.

The junction box 7 consists of a lower compartment 9 and an upper compartment 10 which are formed from sheet metal. The lower edges of said upper compartment rest within the upwardly extending peripheral flange 11 of said lower compartment. The lower compartment 9 is adjustably supported in a tray 12, and after adjustment is fixed in a set position so that when the bottom 13 of the tray rests upon the formwork of the floor, the upper edge 14 of said tray will be flush with the rough structural floor slab, and the upper edge 15 of said lower compartment will be flush with the finished floor. The edges 14 and 15 may serve as screeds or grounds in leveling off the rough structural floor slab or making the finished floor. The lower compartment 9 and the tray 12 are embedded in the floor, and then the upper compartment 10, which is adapted to extend upwardly into the wall of the building may be placed upon said lower compartment and fixed thereto as will hereinafter be described. The top 16 of the upper compartment 10 is somewhat below the top edge of the baseboard 17, and the front side plate 18 of said upper compartment is removable for ready access to said upper compartment and also to the lower compartment 9, for feeding or pulling wires therethrough or making connections to the wires therein. The lower edge of the front side plate 18 is bent inwardly at 19 to form a lip for engaging the narrow plate 20 at the lower part of the front side of the upper compartment 10, and a lock 21 operated by a key is adapted to engage a keeper 22 depending from the top 16 of the upper compartment 10 for preventing access to said compartment and the lower compartment except by an authorized person.

In order to provide for convenient adjustment of the lower compartment 9 vertically, longitudinally and transversely relative to the tray 12, and after adjustment fix same in a set position, mechanism now to be described is employed. Spot welded or otherwise secured to the bottom 23 of the lower compartment 9 are extending end plates 24 and 25, in which are threaded adjusting screws indicated by 26 and adapted to rest upon the inside of the bottom 13 of the tray 12. Fixed to the inside of the bottom of said tray are transversely extending tubular guides 27 and 28 having slots at 29 in their upper sides. Said guides are adapted to receive the rectangular heads 30 of bolts indicated by 31 and extending through longitudinal slots 32 in the bottom 23 of the lower compartment 9. The nuts 33 of the bolts 31 are adapted to cause the adjusting screws 26 to bind against the inner side of the bottom 13 of the tray 12 and thereby fix the lower compartment 9 in an adjusted set position.

For the purpose of dividing the upper compartment 10 and the lower compartment 9 into sections for accommodating various types of electric service wires and thus keeping them segregated, partitions forming sections, and raceways, and conduits are arranged in said compartments as will now be described. Said partitions and conduits are spot welded or otherwise secured to the walls of said compartment. A vertical partition 34 extends from side to side of the lower compartment 9 in spaced relation to its end wall 35, and from bottom to top thereof. A pair of vertical partitions 36 and 37 connected by a horizontal bottom 38 from side to side of the lower compartment 9 midway between the partition 34 and its other end wall 39, and said bottom is in spaced relation to the bottom 23 of said lower compartment to provide a raceway 40. A vertical and transverse partition 41, extends from side to side and from top to bottom of the upper compartment 10, and is adapted to overlap and engage the vertical partition 34 of the lower compartment 9. Also arranged in the upper compartment 10 and extending from side to side thereof are a plurality of vertical partitions 42 and 43 connected by a top 44, which is in spaced relation to the top 16 of said compartment to provide a raceway 45. A longitudinally extending retaining plate 46 is removably fixed to the tops 44 and 16 at the front side of the upper compartment 10 to permit the convenient insertion or removal of a plurality of wires bodily instead of separately threading same through the raceway 45. Extending from the partition 34 to the partition 36 at the rear side of the upper compartment is a channel raceway 47 for establishing communication between the sections formed by said partitions. The vertical partitions 42 and 43 overlap and are adapted to engage the partitions 36 and 37 of the lower compartment. For removably fixing the upper compartment 10 to the lower compartment 9, ears as indicated by 48 depend from the partitions 41, 42 and 43, and bolts, as indicated by 49, pass through openings therein and through openings in the partitions 34, 36 and 37 of the lower compartment 9.

Extending through and connected to the partition 34 and passing through the end wall 35 is a conduit pipe 50, and a smaller conduit pipe 51. Also extending through and connected to the end wall 35 is a conduit pipe 52. Extending through and connected to the end wall 39 near the bottom 23 are conduit pipes 53 and 54, and a conduit pipe 55 extends through said end wall and through the partition 37 and is connected to said partition. The connections of said conduit pipes are preferably made by means of the ordinary collar and lock-nut indicated by 56 and 57. The front wall 58 of the lower compartment is provided with pairs of longitudinal rectangular openings as at 59 and 60 and fixed to said front wall are flanges 61 and 62 having openings corresponding to and arranged opposite said openings of the front wall. Conduits of rectangular cross section indicated by 63—64 and 65—66 extend from the pairs of openings 59 and 60 of the flanges 61 and 62 and are fixed thereto by set-screws at 67. The flanges 61 and 62 are provided with grooves at 68 for receiving suitable cement for making a water tight connection with the conduits to said flanges. Knock outs such as indicated at 69 and 70 of various sizes and shapes are provided as desired in the front wall 58 of the lower compartment 9, also as at 71 and 72 in the end walls 35 and 39 and as at 73 in the top 16 of the upper compartment for attachment of suitable conduits.

It is sometimes desired to provide a telephone distribution strip cabinet in connection with these junction boxes, and such a cabinet as heretofore mentioned is shown at 8. The cabinet may be of any design and is bolted at 74 and 75 to the top 16 of the upper compartment 10, and entrances thereto from the junction box are established by means of the knock outs as at 76 in the top 16 of the upper compartment thereof. The telephone wires enter the top of the cabinet 8 through an opening and conduit at 77.

The construction of the junction box having been described, the manner of installing the various classes of electric service wires therein and therethrough will now be described:

Assuming that it is desired to install an electrical wiring system such as illustrated in Fig. 1, for a single bay of an office building or a plurality of adjacent bays. The power and light wires must be kept separate from the telephone, buzzer, clock, and similar wires, yet accessible for the purpose of making connections or changes thereto, and this is accomplished in a simple and practical manner by the use of our junction boxes.

The home run power and light wires pass through conduit 78 and the knockout opening 69 into section 79 of the junction box, and conductors extend from said home run wires through the conduit 55, and from conductors therefrom through the raceway 47 into the section 80 and out therefrom through the conduit 52. The conductors extending from conduits 55 and 52 may lead into the next junction boxes or wherever desired. Or said home run power and light wires, or conductors extending therefrom, may extend from the junction box through the smaller rectangular opening 60 and the conduit 65 leading from said opening and embedded in the floor.

The home run wires for all other purposes enter the section 81 of the junction box through conduit 82 and opening 70, and out of said section through conduits 50 and 51 to the next junction box or to any desired point. Conductors from the home run wires entering section 81 extend through the raceway 40 into section 83, and either out through the conduits 53 or 54, or through the knockout opening 72 and conduit 84 extending therefrom, to any desired point. Or said home run wires for other purposes or conductors therefrom may extend from the junction box by way of the larger rectangular opening 59 and conduit 63 leading therefrom and embedded in the floor.

The telephone wires enter the top of the distribution strip cabinet 8 at 77, pass therethrough and through the knockout opening 76 of the top 16 of the upper compartment 10 into the section 83, thence through the raceway 45 into the section 81 and out by way of the conduit 50 or 51 to any desired point. Or said telephone wires or conductors therefrom may extend from the section 83 through the conduits 53 and 54 or from the section 81 through the conduits 63 or 64.

As illustrated in Fig. 1, the power and light wires from the junction box may pass to a conduit 85, and current may be taken off at 86 and conducted to any ordinary outlet plug or switch as at 87, or the other wires from the junction box may be directed as for instance to a clock 88, or to a buzzer, or other similar device. The manner of installing an electric wiring system using our junction box for the purpose of keeping the power and light wires separate from the other wires and convenient for making connections and changes thereto within said junction box may be varied from that described according to the requirements of a particular building and the ingenuity of the electrician making the installation. Right and left hand junction boxes as shown in Fig. 1 are preferably employed. The wires in the conduits 63, 64, 65 and 66 under the floor may be tapped at any convenient point as in ordinary practice.

From the drawings and description it is apparent that this junction box is practical, and is convenient for installation both in the floor and also in the wall of a building, that it permits the distribution of electric wires for various services and the individual servicing or metering of same, that it permits ready access to the various electric wires when it is desired to make changes or additions thereto or for testing the same.

Although the construction described is well adapted for accomplishing the intended purposes, it will be understood that slight changes in the details of construction may be made within the scope of the claims.

Having fully described our invention, what we claim is:

1. In a junction box, the combination of a compartment, the compartment having a front and rear wall and end walls and a top and bottom wall, a vertical partition extending from said front and rear walls and said top and bottom walls and being in spaced relation to one of said end walls, a pair of vertical partitions extending from said front and rear walls and terminating short of said top and bottom walls, said pair of vertical partitions being arranged in spaced relation and intermediate of the first mentioned partition and the other of said end walls, horizontal plates connecting the tops and the bottoms of said pair of vertical partitions, a raceway extending from the first mentioned partition to the next of said pair of partitions, conduit pipes extending from the first mentioned partition to outside of said compartment, conduit pipes extending from one of said pair of partitions to outside of said compartment, and said end walls being provided with outlet and inlet openings.

2. In a junction box, the combination of a compartment, the compartment having a front wall and end walls, the front wall near its bottom being provided with pairs of openings, the front wall being provided with knock-out openings between said pairs of openings, the compartment being divided into end and intermediate sections, one opening of said pairs of openings leading into one end section and the other of said pairs of openings leading into the other end section, one of said knock-out openings leading into the last mentioned section, another of said knock-out openings leading into the same section as the opening of the other pair of openings, the end wall being provided with openings, and conduit pipes establishing communication from the intermediate sections of the compartment through said end walls thereof.

3. In a junction box, the combination of a compartment, the compartment having a front wall, and a rear wall and end walls and a top and bottom wall, the compartment being divided into end sections and a pair of intermediate sections, one of said intermediate sections terminating short of the top and bottom walls of said compartment to provide raceways, a channel raceway extending from one end section through one of said intermediate sections and to the other of said intermediate sections, the front wall being provided with openings leading into said end sections, the front wall being provided with openings leading into said intermediate sections, the front wall being provided with knock-out openings leading into said intermediate sections, said ends of said compartment being provided with openings, and conduit pipes establishing communication from said intermediate sections through said end walls of said compartment.

4. In a junction box, the combination of a compartment, the compartment having a front wall, and a rear wall and end walls and a top and bottom wall, the compartment being divided into end sections and a pair of intermediate sections, one of said intermediate sections terminating short of the top and bottom walls of said compartment to provide raceways, said front wall of said compartment consisting of a lower portion and an upper portion, the upper portion of said front wall being removable, a retaining plate, the retaining plate being removably arranged between the top wall of said compartment and the top of said intermediate section thereof, a channel raceway extending from one end section through one of said intermediate sections and to the other of said intermediate sections, the front wall being provided with openings leading into said end sections, the front wall being provided with openings leading into said intermediate sections, the front wall being provided with knock-out openings leading into said intermediate sections, said ends of said compartment being provided with openings, and conduit pipes establishing communication from said intermediate sections through said end walls of said compartment.

5. In a junction box, the combination of a lower compartment, an upper compartment, the upper and lower compartments having front and rear walls and end walls, the lower compartment having a bottom wall, the upper compartment having a top wall, the upper compartment being removably supported upon the lower compartment, the upper and lower compartments being divided into right and left hand vertical end sections and right and left hand vertical intermediate sections, a channel raceway connecting said right hand section with said left hand intermediate section, the end walls of said lower compartment being provided with openings, conduit pipes leading from said right and left hand intermediate sections and extending through said right and left hand end sections and through said right and left hand end walls of said lower compartment, said front wall of said lower compartment being provided with openings leading into said end sections and said intermediate sections, and said front wall of said lower compartment being provided with openings leading into said intermediate sections.

6. In a junction box, the combination of a lower compartment, an upper compartment, the upper and lower compartments having vertical front and rear walls and end walls, the lower compartment having a horizontal bottom wall, the upper compartment having a horizontal top wall, the upper compartment being removably supported upon the lower compartment, the upper and lower compartments being divided into right and left hand end sections and right and left hand intermediate sections, raceways above and below one of said intermediate sections, a channel raceway connecting said right hand section with said left hand intermediate section, the end walls of said lower compartment being provided with openings, conduit pipes leading from said right and left hand intermediate sections and extending through said right and left hand end sections and through said right and left hand end walls of said lower compartment, said front wall of said lower compartment being provided with openings leading into said end sections and said intermediate sections, said front wall of said lower compartment being provided with openings leading into said intermediate sections, and said top wall of said upper compartment being provided with openings leading into said end sections and said right hand intermediate sections.

7. In a junction box, the combination of a lower compartment, an upper compartment, the upper and lower compartments having front and rear walls and end walls, the lower compartment having a bottom wall, the upper compartment having a top wall, the upper compartment being removably supported upon the lower compartment, the upper and lower compartments being divided into right and left hand end sections and right and left hand intermediate sections, raceways above and below one of said intermediate sections, a channel raceway connecting said right hand section with said left hand intermediate section, the end walls of said lower compartment being provided with openings, conduit pipes leading from said right and left hand intermediate sections and extending through said right and left hand end sections and through said right and left hand end walls of said lower compartment, said front wall of said lower compartment being provided with openings leading into said end sections and said intermediate sections, said front wall of said lower compartment being provided with openings leading into said intermediate sections, said top wall of said upper compartment being provided with openings leading into said end sections and said right hand intermediate sections, a telephone strip cabinet supported from said top of said upper compartment, and said top of said upper compartment being provided with openings leading into said cabinet.

8. In a junction box, the combination of a compartment, a tray, the tray having a horizontal bottom and upright sides and ends, the tray being arranged below said compartment, adjusting screws engaging the bottom of said tray and supporting said compartment, guides fixed to the bottom of said tray and extending transversely, bolts, the bolts being slidable in said guides, said compartment having a bottom, and the bottom of the compartment having longitudinally extending slots for receiving said bolts.

9. In a junction box, the combination of a lower compartment, the lower compartment being of a height for embedding in the floor of a building, an upper compartment, the upper compartment being removably fixed to the lower compartment for embedding in the wall of a building, the lower compartment having sides, the sides being provided with openings, the upper compartment having openings leading therefrom, the upper and lower compartment having end and intermediate sections, the sections of the lower compartment being in communication with the sections of the upper compartment, and conduit pipes establishing communication from the intermediate sections to the outside of the lower compartment.

10. In a junction box, the combination of a lower compartment, the lower compartment being of a height for embedding in the floor of a building, an upper compartment, the upper compartment being removably fixed to the lower compartment for embedding in the wall of a building, the lower compartment having sides, the sides being provided with openings, the upper compartment having openings leading therefrom, the upper and lower compartment having end and intermediate sections, the sections of the lower compartment being in communication with the sections of the upper compartment, conduit pipes establishing communication from the intermediate sections to the outside of the lower compartment, a raceway establishing communication from one end section to an intermediate section, and the end sections being provided with inlet and outlet openings.

11. In a junction box, the combination of a lower compartment, an upper compartment, the upper compartment being removably fixed to the lower compartment, a tray, the tray having a horizontal bottom and vertical sides and ends, the lower compartment being adjustably supported from the bottom of said tray, means provided for securing the lower compartment to said tray in an adjusted position, and said lower compartment being of a height and said tray having its sides and ends of a height for embedding in the floor of a building.

FRANK J. RESKE.
EDWIN J. TRUTHAN.